US009317902B2

(12) United States Patent
Kawata et al.

(10) Patent No.: US 9,317,902 B2
(45) Date of Patent: Apr. 19, 2016

(54) DEVICE AND METHOD OF IMAGE PROCESSING FOR DENOISING BASED ON DEGREE OF CONCENTRATION OF CONTRIBUTION RATIOS OF BASIS PATTERNS

(71) Applicant: KABUSHIKI KAISHA TOSHIBA, Tokyo (JP)

(72) Inventors: Satoshi Kawata, Yokohama (JP); Nao Mishima, Inagi (JP); Toshimitsu Kaneko, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 94 days.

(21) Appl. No.: 14/136,455

(22) Filed: Dec. 20, 2013

(65) Prior Publication Data

US 2014/0185956 A1  Jul. 3, 2014

(30) Foreign Application Priority Data

Dec. 28, 2012  (JP) ................................. 2012-288414

(51) Int. Cl.
*G06K 9/40* (2006.01)
*G06T 5/00* (2006.01)

(52) U.S. Cl.
CPC .. *G06T 5/002* (2013.01); *G06K 9/40* (2013.01)

(58) Field of Classification Search
None
See application file for complete search history.

(56) References Cited

U.S. PATENT DOCUMENTS

| | | | |
|---|---|---|---|
| 6,888,955 B2 * | 5/2005 | Masumoto et al. | 382/118 |
| 7,187,798 B1 * | 3/2007 | Payton | 382/166 |
| 8,693,804 B2 * | 4/2014 | Kawata et al. | 382/278 |
| 8,768,018 B2 * | 7/2014 | Ishikawa et al. | 382/128 |
| 2001/0038714 A1 * | 11/2001 | Masumoto et al. | 382/209 |
| 2005/0286768 A1 * | 12/2005 | Battle | 382/190 |
| 2008/0310697 A1 * | 12/2008 | Razifar et al. | 382/131 |
| 2009/0263001 A1 * | 10/2009 | Ding et al. | 382/131 |
| 2010/0142786 A1 * | 6/2010 | Degani et al. | 382/131 |
| 2010/0272340 A1 * | 10/2010 | Bar-Aviv et al. | 382/131 |
| 2011/0142308 A1 * | 6/2011 | Ishikawa et al. | 382/128 |
| 2011/0272161 A1 * | 11/2011 | Kumaran et al. | 166/369 |
| 2011/0297369 A1 * | 12/2011 | Kumaran et al. | 166/250.01 |
| 2011/0317916 A1 * | 12/2011 | Zhang et al. | 382/167 |

(Continued)

OTHER PUBLICATIONS

"Denoising of Hyperspectral Imagery Using Principal Component Analysis and Wavelet Shrinkage," Guangyi Chen et al, IEEE Transactions on Geoscience and Remote Sensing, vol. 49, No. 3, Mar. 2011, pp. 873-980.*

(Continued)

*Primary Examiner* — Wenpeng Chen
(74) *Attorney, Agent, or Firm* — Finnegan, Henderson, Farabow, Garrett & Dunner LLP

(57) ABSTRACT

An image processing device includes processing circuitry configured to acquire a plurality of basis patterns for converting a first region and a second region in a target image, calculate a contribution ratio of each basis pattern, and select one or more basis patterns from higher contribution ratio to lower contribution ratio until a sum of contribution ratios of the selected one or more basis patterns reaches a specific first threshold. The processing circuitry is further configured to generate a control signal of an intensity that increases with a number of the one or more selected basis patterns, project a third region in the target image to the basis patterns to obtain a projection coefficient, reduce noise of the projection coefficient based on the intensity of the control signal, and reconstruct the third region using the projection coefficient after the noise is reduced.

19 Claims, 5 Drawing Sheets

(56) References Cited

U.S. PATENT DOCUMENTS

2013/0251245 A1* 9/2013 Porikli et al. ............... 382/159
2013/0338927 A1* 12/2013 Kumaran ..................... 702/14

OTHER PUBLICATIONS

"Adaptive principal components and image denoising," D. D. Muresan et al. in IEEEICIP, 2003, vol. I, pp. 101-104.*

Dabov et al.; "BM3D Image Denoising With Shape-Adaptive Principal Component Analysis", SPARS09, Department of Signal Processing, Tampere University of Technology, 6 pages, (2009).

Yamauchi et al.; "Blind Denoising Using Non Local PCA", MIRU2011, pp. OS3-3 : 432-OS3-3 : 439, 2011 (13 pgs.).

\* cited by examiner

DEVICE AND METHOD OF IMAGE PROCESSING FOR DENOISING BASED ON DEGREE OF CONCENTRATION OF CONTRIBUTION RATIOS OF BASIS PATTERNS

CROSS-REFERENCE TO RELATED APPLICATION(S)

This application is based upon and claims the benefit of priority from the Japanese Patent Application No. 2012-238114, filed on Dec. 28, 2012; the entire contents of which are incorporated herein by reference.

FIELD

Embodiments described herein relate generally to a device and a method of image processing to reduce noise.

BACKGROUND

As an image processing technique for random noise reduction in an image, a BM3D with shape-adaptive PCA (BM3D-SAPCA) method, for instance, has been proposed. In the BM3D-SAPCA method, a principal component analysis of a reference block being a set of local N pixels in an image and periphery blocks collected from around the reference block, which is similar to the reference block, is conducted, and d basis patterns of which eigenvalues are equal to or greater than a certain thresholds are selected from among obtained N basis patterns. The reference block and the periphery blocks are projected to a subspace defined by the selected d basis patterns, and with respect to d1 projection coefficients obtained for each block, one or more projection coefficients of which absolution values are smaller than a certain threshold t are replaced with zero. By having each block reconstructed by a linear sum of the d1 basis patterns using renewed projection coefficients, it is possible to reduce noise from the reference block and the periphery blocks.

As another image processing technique for random noise reduction in an image, a non-local PCA method has been proposed. In the non-local PCA method, a weighted principal component analysis in which a similarity between periphery blocks being similar to a reference block and the reference block is used as a weight is executed for the periphery blocks, and d2 basis patterns of which eigenvalues are equal to or greater than a certain threshold as are selected from among obtained N basis patterns. The reference block is projected to a subspace defined by the selected d2 basis patterns, and by having the reference block reconstructed by a linear sum of the d2 basis patterns using obtained d2 projection coefficients, noise in the reference block can be reduced.

DETAILED DESCRIPTION

Exemplary embodiments of a device and a method of image processing to reduce noise will be explained below in detail with reference to the accompanying drawings.

First Embodiment

/Configuration

Figure 1:
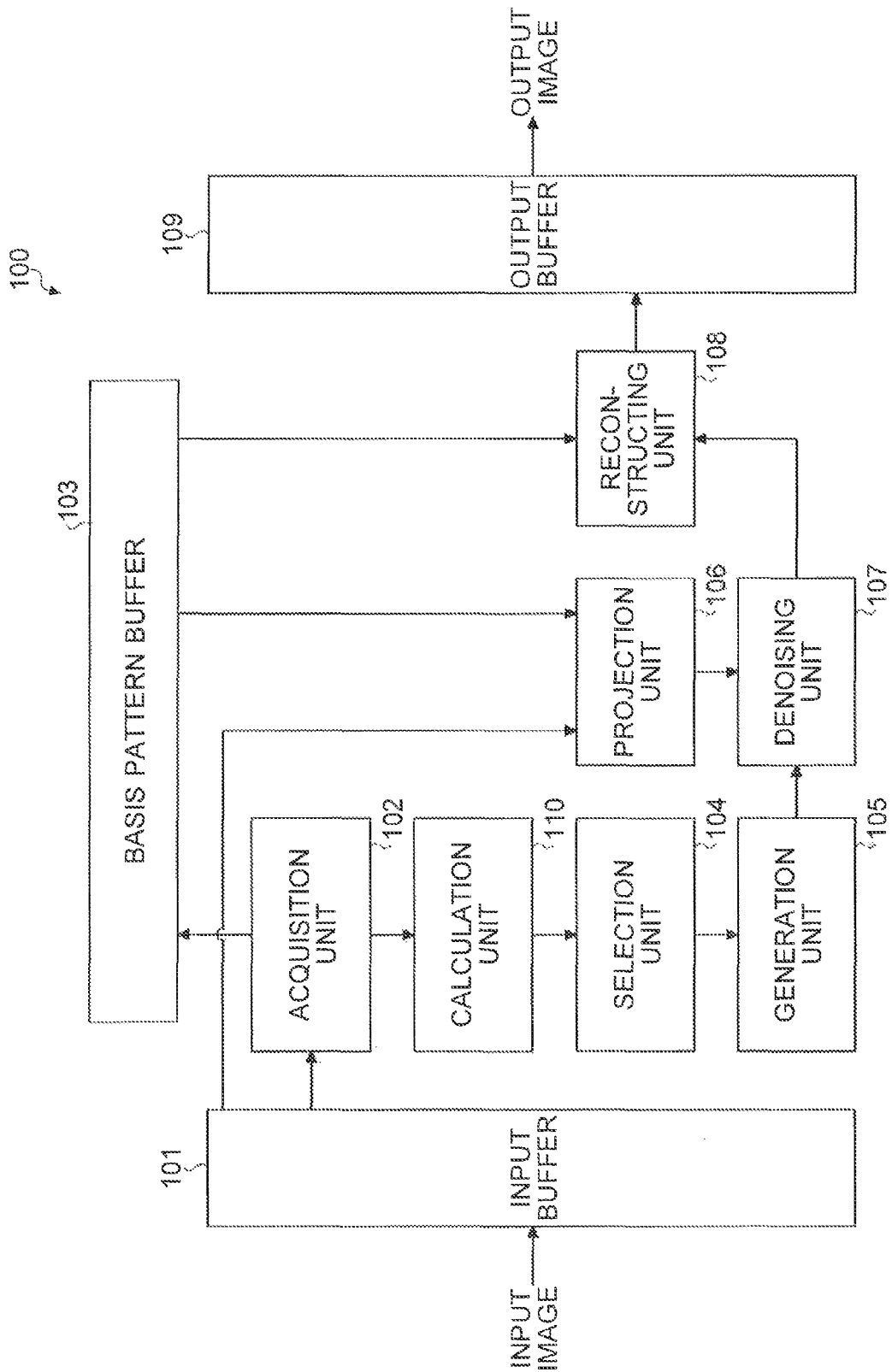
FIG. 1 is a block diagram showing a configuration example of an image processing device according to a first embodiment.

In the following, an image processing device according to a first embodiment will be explained. FIG. 1 shows an example of a configuration of an image processing device according to the first embodiment. As shown in FIG. 1, the image processing device 100 has an input buffer 101, an acquisition unit 102, a calculation unit 110, a basis pattern buffer 103, a selection unit 104, a generation unit 105, a projection unit 106, a denoising unit 107, a reconstruction unit 108 and an output buffer 109. The input buffer 101 temporarily stores a specific amount of image data, which is one frame or a partial area of an image, for instance, inputted as an input image as a target image. The output buffer 109 temporarily stores denoised image data, and outputs the image data as an output image.

All or some of the acquisition unit 102, the calculation unit 110, the selection unit 104, the generation unit 105, the projection unit 106, the denoising unit 107 and the reconstruction unit 108 can be structured by one or more hardware cooperating with each other and/or software programs operating on a CPU (central processing unit).

The target image may be a color image, and each pixel constructing the target image has three pixel values of red, green and blue. In the following, for the sake of simplification, it is assumed that each pixel has a single pixel value. The target image is not limited to a color image, and it can also be a monochrome image of which each pixel has a brightness value as a pixel value. Furthermore, it is also possible that the target image is an image having a different color for each pixel.

The acquisition unit 102 analyzes a first, region including pixels (hereinafter to be referred to as first pixels) selected from a plurality of pixels in the target image stored on the input buffer 101 and a second region including second pixels different from the first pixels, generates basis patterns for converting the first region and the second region, and acquires them. At least one of the obtained basis patterns is stored on the basis pattern buffer 103.

The calculation unit 110 calculates a contribution ratio for every basis pattern acquired by the acquisition unit 102, and transmits the calculated contribution ratios to the selection unit 104. Each contribution ratio is a value representing a statistical importance level of each basis pattern for constructing the image.

The selection unit 104 selects, based on a contribution ratio of each basis pattern acquired from the calculation unit 110, basis pattern in order of contribution ratio from the highest to the smallest until a sum of selected contribution ratios reaches a specific first threshold. The selection unit 104 transmits the number of the selected basis patterns to the generation unit 105.

The generation unit 105 generates a control signal and transmits the control signal to the denoising unit 107; the larger the number of the basis patterns selected by the selection unit 104 is, the higher the intensity of the control signal becomes.

The projection unit 106 projects one or more third regions each of which includes one or more third pixels obtained from the target image to the basis patterns stored on the basis pattern buffer 103. Each third pixel may be the same as the first pixel or the second pixel, or may be different from the first pixel or the second pixel. The projection unit 106 transmits one or more projection coefficients obtained by projecting the third regions to the basis patterns to the denoising unit 107.

The denoising unit 107 conducts, with respect to the projection coefficient calculated by the projection unit 106, denoising based on the intensity of the control signal generated by the generation unit 105; in which the higher the intensity of the control signal is, the stronger the denoising becomes. The denoising unit 107 transmits the denoised projection coefficients to the reconstruction unit 108.

The reconstruction unit 108 reconstructs the third regions by linear sums or the basis patterns stored on the basis pattern buffer 103 using the projection coefficients generated by the denoising unit 107. The reconstruction unit 108 stores the reconstructed third regions on the output buffer 109.

/Regarding Generation of Basis

Here, the above-mentioned, generation of the basis patterns will be described.

The acquisition unit 102, firstly, extracts one or more partial images from the input buffer 101 as the first region and the second region. At this time, as the second region, it is possible to pick up a partial image spatially near the first region, or it is possible to pick up a partial image similar to the first region based on an evaluation result of similarity between the first region and the partial image. As the similarity, it is possible to use a sum of squared differences between the first region and the second region, a sum of absolute differences between the first region and the second region, or the like.

Next, the acquisition unit 102 generates a vector arranging pixel values included in each partial image as a sample vector. Then, the acquisition unit 102 generates basis patterns by conducting a principal component analysis on the sample vectors generated from the partial images. At this time, the acquisition unit 102 may conduct a weighted principal component analysis in which similarities are used as weights. By conducting the principal component analysis or the weighted principal component analysis, it is possible to obtain the basis patterns and eigenvalues corresponding to each basis pattern.

For example, when each partial image is a rectangle block of three-by-three pixels and each pixel has pixel values of three colors (red, green, and blue), 27 basis patterns (=3×3×3) and 27 eigenvalues are generated. In such case, each basis pattern is constructed from 27 elements.

The eigenvalues obtained as a result of the principal component analysis represent statistical contribution ratios of the corresponding basis patterns. Therefore, the calculation unit 110 calculates statistical contribution ratios of the basis patterns using the eigenvalues generated by the acquisition unit 102.

A basis pattern with high contribution ratio contributes largely to the expression of the picked-up sample vector. Therefore, a value of each eigenvalue divided by a summation of the eigenvalues represents the contribution ratio of each basis pattern. For example, when all of the picked-up sample vectors are similar to one another, as a result of the principal component analysis will indicate that some basis patterns have high contribution ratios. On the other hand, when the picked-up sample vectors are not similar to one another, the contribution ratios will be dispersed on a lot of basis patterns.

As the contribution ratio of each basis pattern, it is also possible to use a value other than the value of each eigenvalue divided by the summation of the eigenvalues. For example, a value of a dispersion value or a standard deviation of inner products of the first region and the second region divided by a summation thereof can be used as the contribution ratio of each basis pattern.

In the image processing device 100 according to the first embodiment, the acquisition unit 102 can transmit the generated eigenvalues to the calculation unit 110 while storing the basis patterns, having been generated as a result of the weighted principal component analysis in which similarities are used as weights, in the basis pattern buffer 103. The calculation unit 110 calculates the contribution ratio of each basis pattern by dividing each eigenvalue generated by the acquisition unit 102 by a summation of the eigenvalues, and transmits the contribution ratios to the selection unit 104.

When the amount of noise corrupting the target image is large, because noise influences the similarity, the similarity between partial images actually similar to each other may become lower and the similarity between partial images actually not similar to each other may become higher. Therefore, even if sample vectors are picked up based on the similarities, similar partial images and dissimilar partial images will be mixed, and as a result, the contribution ratios will be dispersed on a lot of basis patterns. On the other hand, when the amount of noise corrupting the target image is small, because true similarities can be calculated as compared to the case where the amount of noise is large, it is possible to pick up similar partial images as the sample vectors. Therefore, the contribution ratios will concentrate on some of the basis patterns. Accordingly, by evaluating a degree of concentration of the contribution ratios, it is possible to determine the amount of random noise corrupting the image.

In the image processing device 100 according to the first embodiment, the selection unit 104 selects, based on the contribution ratios, basis patterns in order of contribution ratio from the highest to the smallest until a sum of selected contribution ratios reaches a specific first threshold. The first, threshold may be a value of 99%, 95%, or the like, for instance. When the contribution ratios concentrate on some of the basis patterns, by selecting a few basis patterns, the sum of contribution ratios of the selected basis patterns may reach the first threshold. On the other hand, when the contribution ratios are dispersed, it is not until a great many basis patterns are selected that the sum of contribution ratios of the selected basis patterns reach the first threshold. The number of the basis patterns selected in this way will be used, for generating the control signal. That is, a kind of control signal of which intensity will monotonically increase according to the number of the selected basis patterns will be generated.

/Regarding Noise Reduction

When noise corrupting the image is white noise uniformly distributed in a wide frequency band, by projecting a partial, image to a plurality of basis patterns, obtained projection coefficients of all the basis patterns may include uniform noise. On the other hand, image signals may concentrate on projection coefficients of some of the basis patterns, for example, in an edge region of the image, a basis pattern representing the edge has a large projection coefficient. When an absolute value or a square value of a projection coefficient of a certain basis pattern is small, by reconstructing a partial image while degenerating the projection coefficient, it is possible to reduce the noise while maintaining the image signal.

In the image processing device 100 according to the first embodiment, the denoising unit 107 conducts a threshold processing using a specific second threshold with respect to the projection coefficients as denoising. That is, when an absolute value of a projection coefficient is smaller than the specific second threshold, the denoising unit 107 denoises by replacing the projection coefficient of the basis pattern with zero. At this time, the higher the control signal is, the higher the second threshold set by the denoising unit 107 becomes, and the lower the control signal is, the lower the second threshold set by the denoising unit 107 becomes. As described above, the control signal is used as an indication for evaluating the level of noise corrupting the image. When the amount of noise corrupting the image is large, because noise in many basis patterns can be reduced, by setting the second threshold high using a high control signal, a strong denoising can be conducted on the partial image. On the other hand, when the amount of noise corrupting the target image, by setting the second threshold low using a low control signal, denoising effect on the control signal can be weaken.

The denoising is not limited to the threshold processing using the above-described second threshold. For example, a filtering process using a Wiener filter for multiplying the projection coefficient by a preset constant can be used for the denoising.

In the above, although the denoising depending on the level of noise corrupting the image has been explained, it is also possible to use a kind of denoising based on a texture of the image by evaluating a degree of concentration of the contribution ratios of the basis patterns. In an edge region of the image, a difference between a similarity of a partial image representing the edge and a similarity of the other partial image becomes conspicuous. Therefore, when the first region is a partial image representing an edge and the second region is a partial image representing the other part, in a weighted principal component analysis based on the similarities, the first region representing the edge contributes largely to the principal component analysis whereas the second region representing the other part does not contribute much to the principal component analysis. Therefore, as to basis patterns to be generated, a basis pattern representing the edge has a large eigenvalue, and the contribution ratio will concentrate on this basis pattern. On the other hand, in a flat region of the image, picked-up partial images are constructed from plane signals with noises and there will be no biases occurring on the similarities. Therefore, with respect to the basis patterns obtained by the weighted principal component analysis, the contribution ratios will disperse. In the edge region, the number of basis patterns selected until the sum of the selected contribution ratios reaches the specific first threshold will be small, and in the flat region, the number of the selected basis patterns will be large. Therefore, by conducting denoising so that noise in a region with a high control signal can be strongly denoised using the control signal which becomes increasingly higher depending on the number of the selected basis patterns, it is possible to reduce the noise in the flat region where noise is more noticeable while counteracting the denoising in the edge region. As a result, it is possible to prevent blur of the edge.

/Regarding Analysis

In the above-description, as a generation method of basis patterns applicable to the first embodiment, the principal component analysis was explained as an example although it is not definite. For instance, it is also possible to generate the basis patterns based on an independent principal component analysis.

/Processing Flow

Figure 2:
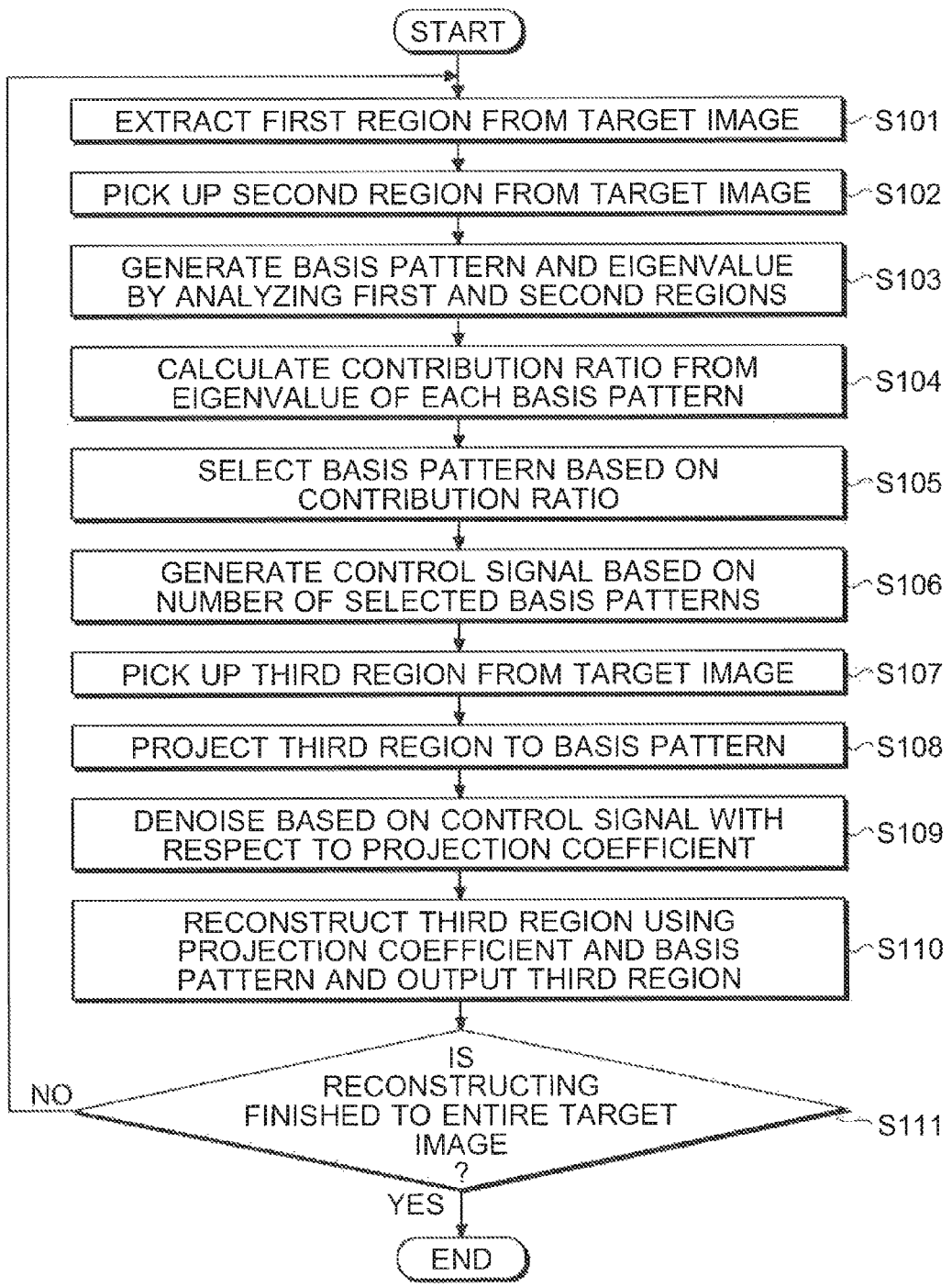
FIG. 2 is a flow chart showing an operation example of the image processing device according to the first embodiment.

Next, an operation example of the image processing device 100 according to the first embodiment will be described below. FIG. 2 is a flow chart showing an operation example of the image processing device according to the first embodiment. Each step in the flow chart shown in FIG. 2 may be executed by a controller mounted on the image processing device 100 controlling each unit of the image processing device 100, for instance.

The first pixels constructing the target image may be selected in a specific order, e.g. an order of raster scan. As an example, as the first pixel, with respect to a single frame target image stored on the input buffer 101, a pixel is selected one by one or one by every specific number of pixels in the order of raster scan while considering a pixel at the upper left corner of a frame (for instance, the upper left corner of a screen) as a starting point.

As shown in FIG. 2, firstly the acquisition unit 102 extracts a first region including a first pixel from a target image stored on the input buffer 101 (step S101). Furthermore, the acquisition unit 102 extracts a second region including a second pixel from the target image stored on the input buffer 101 (step S102). The second pixel can overlap with the first pixel.

Next, the acquisition unit 102, by analyzing the first region and the second region, generates basis patterns and eigenvalues of the basis patterns (step S103). The generated basis patterns are stored on the basis pattern buffer 103. The generated eigenvalues are transmitted to the calculation unit 110.

Next, the calculation unit 110 calculates a contribution ratio of each basis pattern based on the eigenvalues generated by the acquisition unit 102 (step S104). A method of calculating the contribution ratio of each basis pattern can be the same as the above-described method. The calculated contribution ratios are transmitted to the selection unit 104.

Next, the selection unit 104 selects basis patterns based on the contribution ratio of each basis pattern until a sum of selected contribution ratios reaches a specific first threshold (step S105). The number of the selected basis patterns is transmitted to the generation unit 105.

Next, the generation unit 105 generates a control signal of which intensity will monotonically increase according to the number of the selected basis patterns (step S106). The generated control signal is transmitted to the denoising unit Next, the projection unit 106 picks up third regions including third pixels from the target image stored on the input buffer 101 (step S107). The third pixels can overlap with the first pixel or the second pixel. Then, the projection unit 106, by projecting the third regions to the basis patterns stored on the basis pattern buffer 103, obtains projection coefficients (step S108). The obtained projection coefficients are transmits to the denoising unit 107.

Next, the denoising unit 107 executes denoising for the projection coefficients by the threshold processing using a second threshold which becomes higher as the control signal becomes higher (step S109). The denoised projection coefficients are transmitted to the reconstruction unit 108.

Next, the reconstruction unit 108 reconstructs the third regions by a linear sum of the one or more basis patterns stored on the basis pattern buffer 103 using the denoised projection coefficients (step S110). The reconstructed third regions are stored on the output buffer 109.

In this way, when a processing result of the third regions are outputted from the reconstruction unit 108, the operation, moves to step S111 where it is determined whether step S110 has been executed on the entire target image stored on the input buffer 101 (step S111). When it is determined that step S110 has not been executed on the entire target image (step S111; NO), the operation returns to step S101, the next first region is selected for the next first pixel, and from then on, a process loop repeating from step S102 to S110 is executed until executions of step S110 are finished with respect to the entire target image. On the other hand, when the executions of step S110 to the entire target image are finished (step S111; YES), the operation is finished.

As described above, in the image processing device 100 according to the first embodiment, by conducting the denoising at step S109 based on the control signal generated at step S106, for evaluating a degree of concentration of the contribution ratios of the basis patterns generated, it is possible to effectively reduce the noise according to the level of noise corrupting the image, a texture of the image, or the like.

Second Embodiment

Next, a device and a method of image processing to reduce noise according to a second embodiment will be explained in detail with the accompanying drawings.

In the first embodiment, the basis patterns generated by analyzing the target image are used. On the other hand, in the second embodiment, a case where pre-generated basis patterns are used is explained as an example.

/Configuration

Figure 3:
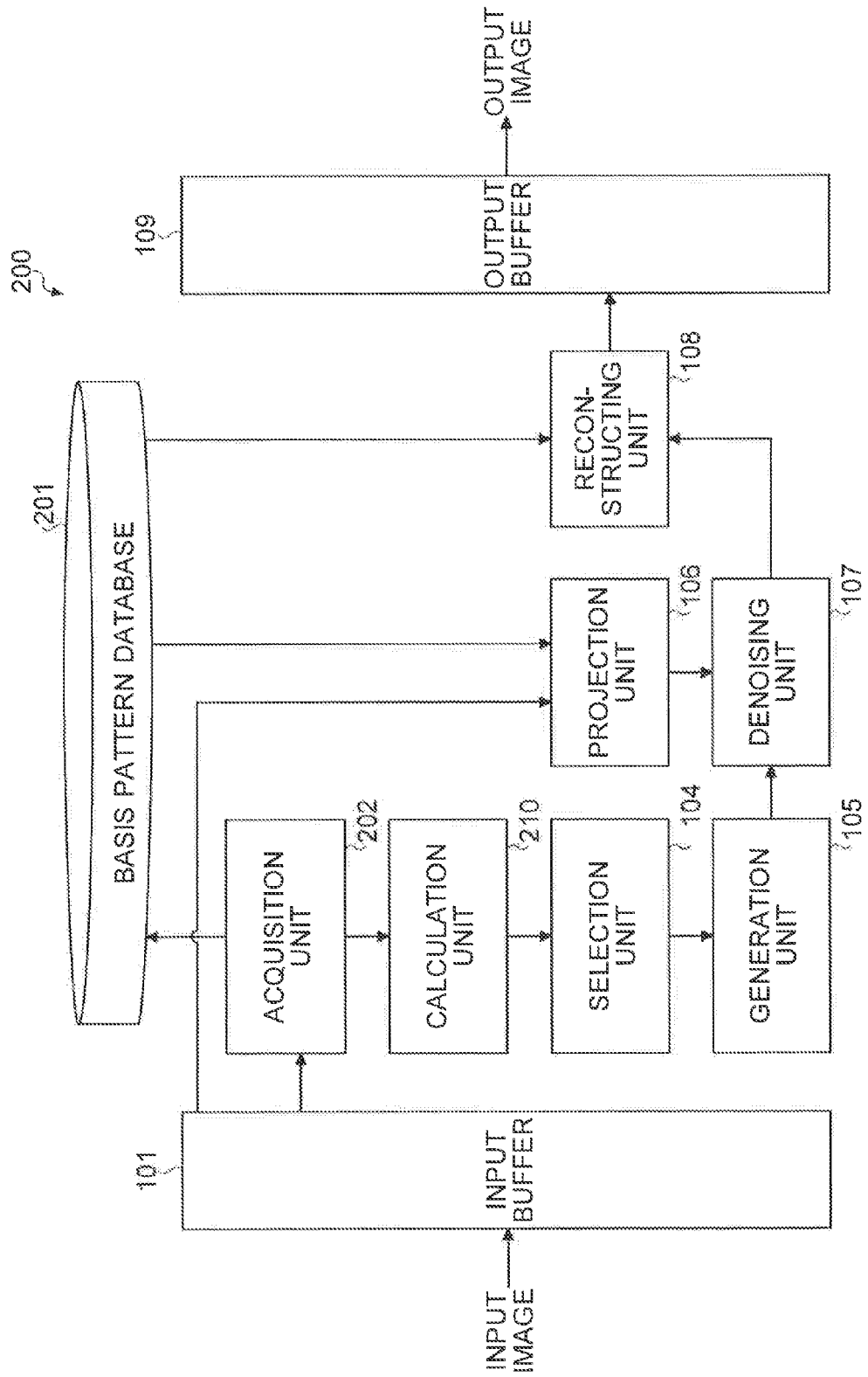
FIG. 3 is a block diagram showing a configuration example of an image processing device according to a second embodiment.

FIG. 3 shows a configuration example of an image processing device according to the second embodiment. In FIG. 3, the same structures as those in FIG. 1 will be labeled using the same reference numbers, and redundant explanations thereof will be omitted. As shown in FIG. 3, the image processing device 200 has the input buffer 101, a basis pattern database 201, an acquisition unit 202, a calculation unit 210, the selection unit 104, the generation unit 105, the projection unit 106, the denoising unit 107, the reconstruction unit 108 and the output buffer 109.

The acquisition unit 102, the calculation unit 210, the selection unit 104, the projection unit 106 and the reconstruction unit 108 can be structured by one or more hardware cooperating with each other and/or software programs operating on a CPU.

Although, the basis patterns are generated from the target image in the image processing device 100 according to the first embodiment, in the image processing device 200 according to the second embodiment, a basis pattern set including basis patterns is previously generated and stored on the basis pattern database 201. The acquisition unit 202 extracts a first region including first pixels selected from a plurality of pixels in the target image stored on the input buffer 101 and a second region including second pixels different from the first pixels, acquires the basis pattern set for the first region and the second region from the basis pattern database 201.

The calculation unit 210 calculates a contribution ratio of each basis pattern included in the basis pattern set acquired by the acquisition unit 202 from the basis pattern database 201. As the contribution ratio, it is possible to use a value of a dispersion of inner products between each of the first region and the second region and the basis pattern of each of the first region and the second region divided by a summation of the inner products, a value of a standard variation of the inner products divided by the summation of the inner products, or the like.

The selection unit 104, the generation unit 105, the projection unit 106, the denoising unit 107, the reconstruction unit 108 and the output buffer 109 can be the same as those in the first embodiment, and the redundant, explanations will be omitted.

/Effect of Using Basis Database without Generating Basis

Generating basis patterns using the principal component analysis, the independent principal component analysis, or the like, requires comparatively high calculation cost. That is, if a basis pattern is generated every time the first region is extracted, as much calculation cost for basis pattern generation is required depending on the number of the first regions. Therefore, as the second embodiment, by using the pre-generated basis patterns, it is possible to reduce the calculation cost for basis pattern generation.

Figure 4:
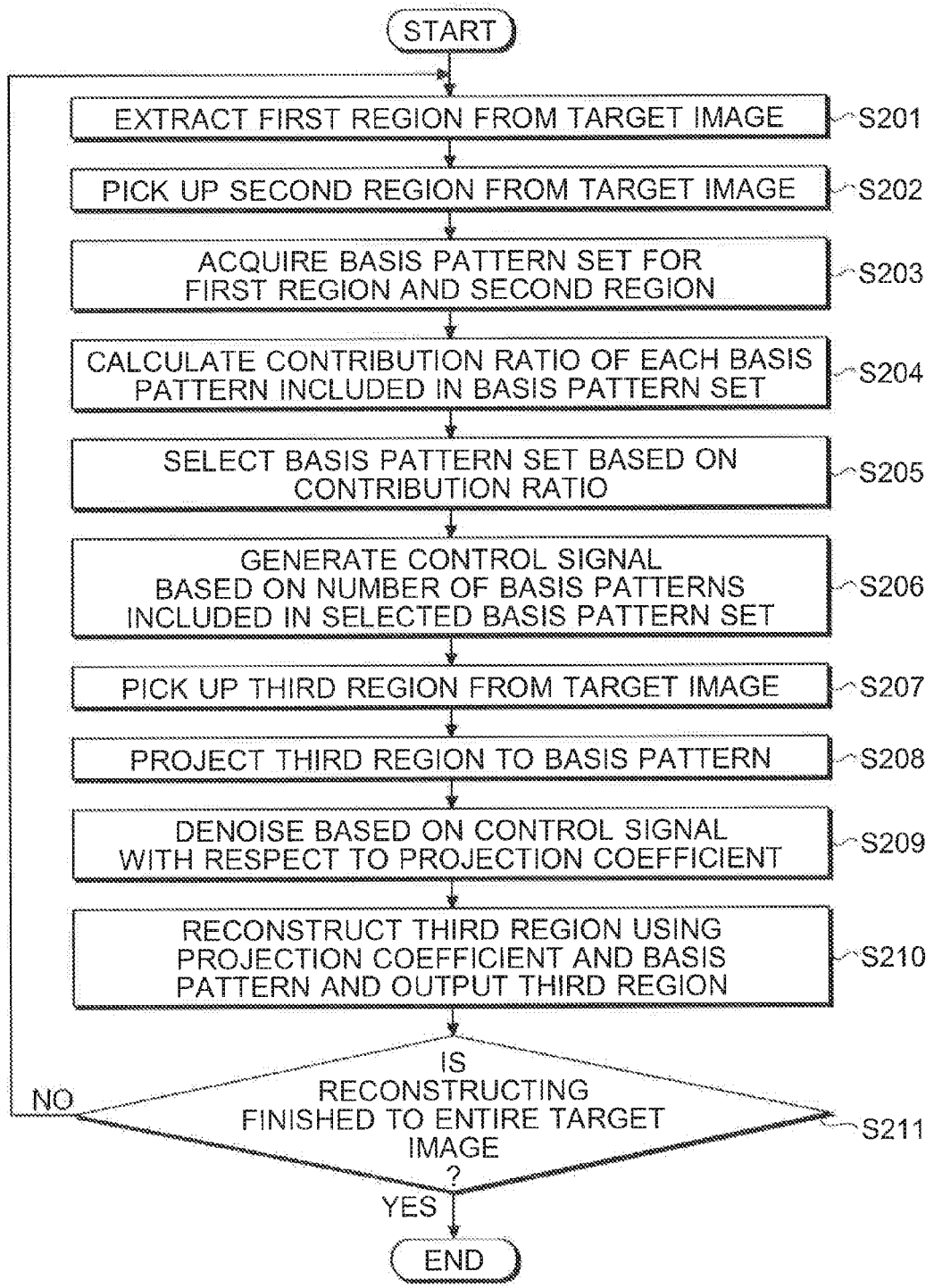
FIG. 4 is a flow chart shoving an operation example of the image processing device according to the second embodiment.

FIG. 4 is a flow chart showing an operation example of the image processing device according to the second embodiment. Each step in the flow chart shown in FIG. 4 may be executed by a controller mounted on the image processing device 200 controlling each unit of the image processing device 200, for instance.

As shown in FIG. 4, firstly, the acquisition unit 202 extracts a first region including a first pixel from a target image stored on the input buffer 101 (step S201). Furthermore, the acquisition unit 202 extracts a second region including a second pixel from the target image stored on the input buffer 101 (step S202). The second pixel can overlap with the first pixel. Then, the acquisition unit 202 acquires a basis pattern set stored on the basis pattern database 201 for the first region and the second region (step S203).

Next, the calculation unit 210 calculates a contribution ratio of each basis pattern included in the basis pattern set acquired by the acquisition unit 202 (step S204). A method of calculating the contribution ratio of each basis pattern can be the same as the above-described method. The calculated contribution ratios are transmitted to the selection unit 104.

Next, the selection unit 104 selects basis patterns based on the contribution ratio of each basis pattern until a sum of selected contribution ratios reaches a specific first threshold (step S205). The number of the selected basis patterns is transmitted to the generation unit 105.

Next, the generation unit 105 generates a control signal of which intensity will monotonically increase according to the number of the selected basis patterns (step S206). The generated control signal is transmitted to the denoising unit 107.

Next, the projection unit 106 picks up third regions including third pixels from the target image stored on the input buffer 101 (step 207). Then, the projection unit 106, by projecting the third regions to the basis patterns stored on the basis pattern buffer 103, obtains projection coefficients (step S208). The obtained projection coefficients are transmits to the denoising unit 107.

Next, the denoising unit 107 executes denoising for the projection coefficients by the threshold processing using a second threshold which becomes higher as the control signal becomes higher (step S209). The denoised projection coefficients are transmitted to the reconstruction unit 108.

Next, the reconstruction unit 108 reconstructs the third regions by a linear sum of the one or more basis patterns stored on the basis pattern database 201 using the denoised projection coefficients (step S210). The reconstructed third regions are stored on the output buffer 109.

In this way, when a processing result of the third regions are outputted from the reconstruction unit 108, the operation moves to step S211 where it is determined whether step S210 has been executed on the entire target image stored on the input buffer 101 (step S211). When it is determined that step S110 has not been executed on the entire target image (step S211; NO), the operation returns to step S201, the next first region is selected for the next first pixel, and from then on, a process loop repeating from step S202 to S210 is executed until executions of step S210 are finished with respect to the entire target image. On the other hand, when the executions of step S210 to the entire target image are finished (step S211; YES), the operation is finished.

As described above, in the image processing device 200 according to the second embodiment, in step S205, the basis patterns are not generated, but using the pre-generated basis patterns. Therefore, it is possible to conduct denoising in step S209 based on the control signal for evaluating a degree of concentration of the contribution ratios of the basis patterns generated in step S206 while saving the calculation cost. As a result, it is possible to effectively reduce the noise according to the level of noise corrupting the image, a design of the image, or the like.

/Regarding Basis Stored on Basis Database

In the image processing device 200 according to the second embodiment, the basis patterns previously stored in the basis pattern database 201 may be previously generated by the principal component analysis, the independent principal component analysis, or the like, from a database of some kind. Or, the basis patterns previously stored on the basis pattern database 201 may be conversion basis patterns of orthonormal system such as a discrete cosine transform, a discrete wavelet transform, or the like.

The basis patterns previously stored on the basis pattern, database 201 do not limited to only one type of basis pattern. That is, it is possible to structure such that the exampled set or conversion basis patterns (basis pattern set) is previously stored and the acquisition unit 202 selects any one of the basis pattern sets based on a degree of concentration of the contribution ratios of each basis pattern set. Specifically, with respect to a basis pattern set A (for instance, a basis pattern group generated by a principal component analysis) and a basis pattern set B (for instance, a basis pattern group of a discrete cosine transform), basis patterns are selected until a sum of selected contribution ratios reaches the specific first threshold, and one with the smaller number of the selected basis patterns between the basis pattern sets A and B is adopted as the basis pattern set for conversion of the third, regions. Although the two basis pattern sets are compared in this example, it is not limited to such case while it is also possible to compare three or more basis pattern sets. Furthermore, an adoption standard of basis pattern set is not limited to such example while it is also possible to adopt a basis pattern set having a greater summation of squares of inner products between each of the first region and the second region and each basis pattern in the basis pattern set, a greater summations of the absolute values of inner products, or the like.

Another Embodiment

Figure 5:
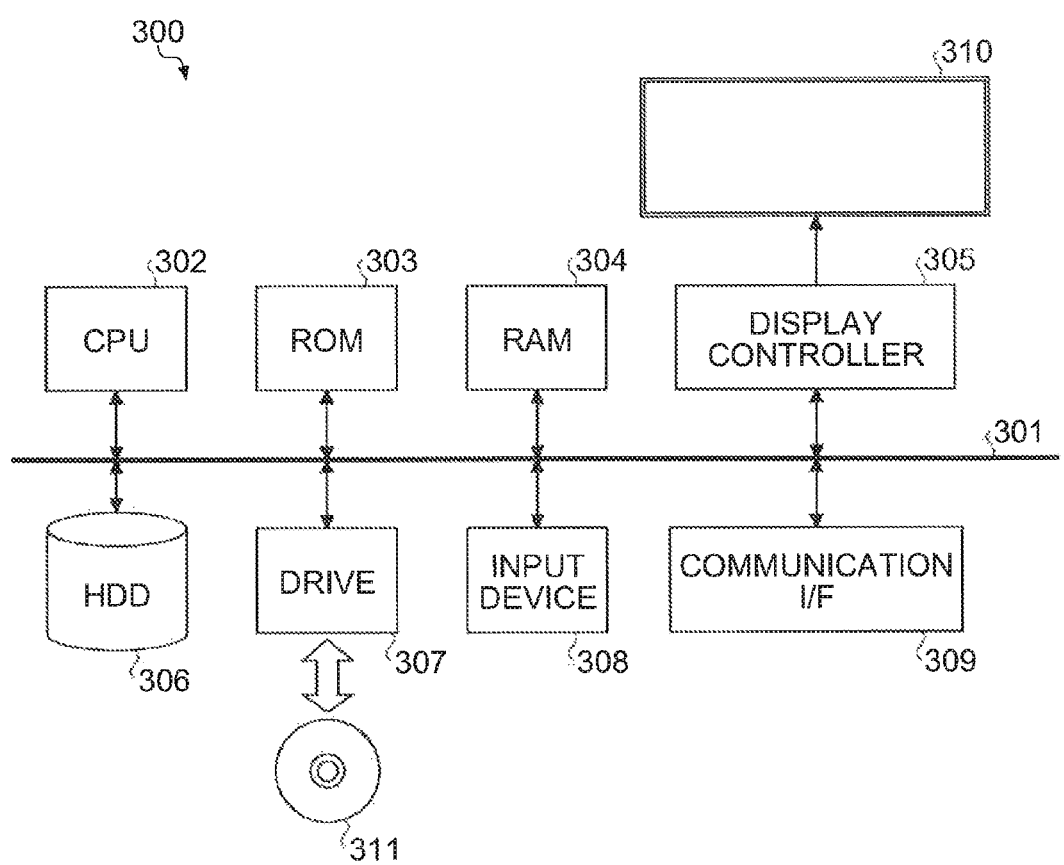
FIG. 5 is a block diagram showing an example of a computer device capable of being applied to the image processing device according to the first embodiment.

The image processing devices 100 and 200 according to the first or second embodiment can be realized using a general computer as a basic hardware. In the following, the image processing device 100 according to the first embodiment will be explained as an example. FIG. 5 shows a configuration example of a computer device 300 capable of being applied to the image processing device 100 according the first embodiment. Because the image processing device 200 according to the second embodiment can also be realized by the computer device 300 as the image processing device 100, the explanation thereof will be omitted.

In the computer device 300 exampled in FIG. 5, a CPU 302, a ROM (read only memory) 303, a RAM (random access memory) 304 and a display controller 305 are connected to a bus 301. To the bus 301, a hard disk 306, a drive device 307, an input unit 308 and a communication I/F 309 are also connected.

The CPU 302 controls the whole computer device 300 according to programs stored on the ROM 303 and the hard disk 306 while using the RAM 304 as a work memory. The display controller 305 converts display control signal generated by the CPU 302 into signal capable of being displayed on a display device 310 and outputs the converted signal to the display device 310.

The hard disk 306 stores image data to be the target image and other data in addition to the above-described programs to be executed by the CPU 302. The drive device 307 has a structure capable of having a removable media 311 inserted/ejected, and can read out/write data from/in the removable media 311. As the removable media 311 for the drive device 307, there are a disk media such as a CD (compact disk), a DVD (digital versatile disk), or the like, and a non-volatile semiconductor memory, for instance.

The input unit 308 inputs/outputs data with respect to the external. For example, the input unit 308 has a specific interface such as an USB (universal serial bus), an IEEE 1394 (institute of electrical and electronics engineers 1394), or the like, and inputs/outputs data using the interface. The image data of the input data can be inputted from the input unit 308.

To the input unit 308, an input device such as a keyboard, a mouth, or the like, may be connected. A user can instruct to the computer device 300 by operating these input devices according to contents for the display device 310, for instance.

The communication I/F 309 communicates to the external communication network using a specific protocol. The image data of the target image can be served from the external communication network via the communication I/F 309.

The acquisition unit 102, the selection unit 104, the generation unit 105, the projection unit 106, the denoising unit 107 and the reconstruction, unit 108 may be realized by an image processing program executing on the CPU 302.

The image processing programs for executing the image processing according to the above-described embodiments may be distributed as being recorded in a computer readable removable medium 311 such as a CD, a DVD, or the like, under a file with installable format or executable format. However, it is not limited to such case while it is also possible to provide the image processing program by previously storing it on the ROM 303.

Furthermore, it is also possible to locate the image processing programs according to the above-described embodiments on a computer connected to a communication network such as the internet so that the programs can be downloaded via the communication network. Moreover, the image processing programs according to the above-described, embodiments can be provided or distributed via a communication network such as the internet.

For example, the image processing programs according to the above-described embodiments may have a module composition including the above-described units (the acquisition unit 102/202, the calculation, unit 110/210, the selection unit 104, the generation unit 105, the projection unit 106, the denoising unit 107 and the reconstruction unit 108). In such case, by the CPU 302 as actual hardware reading out the image processing program from the hard disk 306 and executing the program, the above-described units are loaded, on a main memory (for instance, the RAM 304), and the above-described units are realized on the main memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
a memory that stores a set of instructions and
processing circuitry configured to execute the set of instructions to:
acquire a plurality of basis patterns for converting a first region and a second region in a target image;
calculate a contribution ratio of each of the plurality of basis patterns;
select one or more of the plurality of basis patterns from higher contribution ratio to lower contribution ratio until a sum of contribution ratios of the selected basis patterns reaches a specific first threshold;
generate a control signal having an intensity that increases with a number of the selected one or more basis patterns;
project a third region in the target image to the plurality of basis patterns to obtain a projection coefficient;
reduce noise associated with the projection coefficient based on the intensity of the control signal, wherein an amount of reduction of the noise increases with the intensity of the control signal; and
reconstruct the third region using the projection coefficient after the noise is reduced.

2. The device according to claim 1, wherein the processing circuitry is configured to execute the set of instructions to generate the plurality of basis patterns by analyzing the first region and the second region.

3. The device according to claim 2, wherein the processing circuitry is configured to execute the set of instructions to generate the plurality of basis patterns by conducting a principal component analysis on the first region and the second region.

4. The device according to claim 2, wherein the processing circuitry is configured to execute the set of instructions to generate the plurality of basis patterns by conducting an independent principal component analysis on the first region and the second region.

5. The device according to claim 3, wherein the processing circuitry is configured to execute the set of instructions to calculate a value by dividing each eigenvalue obtained as a result of the principal component analysis by a summation of the eigenvalues.

6. The device according to claim 3, wherein the processing circuitry is configured to execute the set of instructions to set the control signal to a number of principal components selected until a sum of selected eigenvalues obtained as a result of the principal component analysis reaches a specific third threshold.

7. The device according to claim 1, wherein the processing circuitry is configured to execute the set of instructions to acquire, with respect to the first region and the second region, the plurality of basis patterns from a set of prepared basis patterns.

8. The device according to claim 7, wherein each of the plurality of basis patterns is a basis of a discrete cosine transform.

9. The device according to claim 7, wherein each of the plurality of basis patterns is a basis of a discrete wavelet transform.

10. The device according to claim 1, wherein the processing circuitry is configured to execute the set of instructions to calculate, as the contribution ratio of each of the plurality of basis patterns, a ratio between a first value and a second value, the first value representing a square of an inner product between each of the first region and the second region and each of the plurality of basis patterns of each of the first region and the second region, the second value representing a summation of the squares of the inner products.

11. The device according to claim 1, wherein the processing circuitry is configured to execute the set of instructions to calculate, as the contribution ratio of each of the plurality of basis patterns, a ratio between a first value and a second value, the first value representing an absolute value of an inner product between each of the first region and the second region and each of the plurality of basis patterns of each of the first region and the second region, the second value representing a summation of the absolute values of the inner products.

12. The device according to claim 1, wherein the processing circuitry is configured to execute the set of instructions to:
calculate a linear sum of the basis patterns using the projection coefficient after the noise is reduced, and
reconstruct the third region using the calculated linear sum.

13. The device according to claim 1, wherein the processing circuitry is configured to execute the set of instructions to denoise the projection coefficient using a second threshold, wherein the second threshold becomes higher as the intensity of the control signal becomes higher.

14. The device according to claim 1, wherein the processing circuitry is configured to execute the set of instructions to calculate, as the contribution ratio of each of the plurality of basis patterns, a ratio between a first value and a second value, the first value representing a dispersion value of inner products of the first region and the second region, the second value representing a summation of the dispersion values of the inner products.

15. The device according to claim 1, wherein the processing circuitry is configured to execute the set of instructions to calculate, as the contribution ratio of each of the plurality of basis patterns, a ratio between a first value and a second value, the first value representing a standard deviation of inner products of the first region and the second region, the second value representing a summation of the standard deviations of the inner products.

16. A method of image processing including:
acquiring a plurality of basis patterns for converting a first region and a second region in a target image;
calculating a contribution ratio of each of the plurality of basis patterns;
selecting one or more of the plurality of basis patterns from higher contribution ratio to lower contribution ratio until a sum of contribution ratios of the selected basis patterns reaches a specific first threshold;
generating a control signal having an intensity that increases with a number of the selected basis patterns;
projecting a third region in the target image to the plurality of basis patterns to obtain a projection coefficient;
reducing noise of the projection coefficient based on the intensity of the control signal, wherein an amount of reduction of the noise increases with the intensity of the control signal; and
reconstructing the third region using the projection coefficient after the noise is reduced.

17. The method according to claim 16, wherein the acquiring of the plurality of basis patterns comprises generating the plurality of basis patterns by analyzing the first region and the second region.

18. The method according to claim 17, wherein the acquiring of the plurality of basis patterns further comprises generating the plurality of basis patterns by conducting a principal component analysis on the first region and the second region.

19. An image processing device comprising:
a processor; and
a memory that stores processor-executable instructions that, when executed by the processor, cause the processor to:
acquire a plurality of basis patterns for converting a first region and a second region in a target image;
calculate a contribution ratio of each of the plurality of basis patterns;
select one or more of the plurality of basis patterns from higher contribution ratio to lower contribution ratio until a sum of contribution ratios of the selected basis patterns reaches a specific first threshold;
generate a control signal of an intensity that increases with a number of the selected basis patterns;
project a third region in the target image to the plurality of basis patterns to obtain a projection coefficient;
reduce noise of the projection coefficient based on the intensity of the control signal, wherein an amount of reduction of the noise increases with the intensity of the control signal; and
reconstruct the third region using the projection coefficient after the noise is reduced.

* * * * *